Patented June 27, 1944

2,352,525

UNITED STATES PATENT OFFICE 2,352,525

CHLORINATION OF POLYMERIC MATERIALS

William John Roy Evans, Blackley, England, assignor to Imperial Chemical Industries Limited, a corporation of Great Britain No Drawing. Application June 27, 1941, Serial No. 400,099. In Great Britain July 1, 1940

5 Claims. (Cl. 260—88)

This invention relates to the manufacture of polymeric materials and more particularly to an improved process for the production of chlorinated polyvinyl chloride.

It has already been proposed in British specification No. 401,200 to chlorinate polyvinyl chloride by the action of chlorine on suspensions of such polymers in carbon tetrachloride or on their solutions in tetrachloroethane. When highly polymerised vinyl chloride is to be chlorinated further according to the methods of the above proposal difficulties are experienced in isolating the chlorinated material, or in obtaining a product which is sufficiently highly chlorinated for some purposes or which shows the required solubility in organic solvents. For instance when highly polymerised vinyl chloride dissolved in tetrachloroethane is acted upon with chlorine, unless very large proportions of the solvent are employed, not only are difficulties experienced in agitating the solution and in passing chlorine into the same but when the product is isolated by adding the reaction medium to a coagulant a gelatinous mass of material is obtained unless inconveniently low temperatures are used during precipitation. The gelatinous mass cannot easily be freed from solvent. Further when suspensions of polyvinyl chloride in carbon tetrachloride are used, although difficulties in isolating the chlorinated product are not experienced, it has not been found possible to obtain products with a sufficiently high chlorine content or with sufficient solubility in organic solvents to be useful for making films or other shapes.

We have now found that, contrary to expectation, these difficulties are avoided by chlorinating polyvinyl chloride suspended in a mixture of carbon tetrachloride and tetrachloroethane.

According to the present invention therefore, highly polymerised vinyl chloride is chlorinated further by a process which comprises interacting chlorine with polyvinyl chloride in the presence of a mixture of carbon tetrachloride and tetrachloroethane.

The polyvinyl chloride to be used for the purposes of this invention may be obtained in any known manner, for example, by polymerising an aqueous emulsion of vinyl chloride by the methods described in British specification No. 410,132.

The proportions of the polymer to the mixture of the organic liquids, namely, the carbon tetrachloride and the tetrachloroethane, are not critical but may conveniently vary between 1 part of the polymer to 14 to 17 parts of the mixture. The proportions of the carbon tetrachloride and of the tetrachloroethane in the mixture likewise are not critical, but may conveniently vary between 0.5 to 1.25 parts of carbon tetrachloride to 1 part of tetrachloroethane.

The further chlorinated material may be recovered as hereinafter described or may be used directly for example as an ingredient of coating compositions. In carrying the process of the present invention into effect the highly polymerised vinyl chloride is agitated at an elevated temperature, for example, at a temperature at or near the boiling point of the particular mixture of the organic liquids being used while chlorine is passed into the agitated suspension. If desired the reaction may be carried out in the presence of light or actinic radiation in order to increase the rate of chlorination. When the required degree of chlorination has been attained, the liquid so obtained may be used directly as already mentioned or the polymer may be recovered by slowly adding to the liquid, a coagulant such as a lower alcohol, for example methanol or ethanol. The chlorinated polymers when precipitated are obtained as finely divided, while solids which may be recovered by filtration, and are useful, especially in the form of solutions in organic liquids, for the production of films and the like.

The following example illustrates but does not limit the invention, all parts being by weight.

Example

A suspension of 200 parts of highly polymerised vinyl chloride in 3000 parts of a mixture of tetrachloroethane and carbon tetrachloride admixed in the ratio of 16 parts to 14 parts respectively, was agitated, heated to and maintained at a temperature of 95–98° C. and illuminated with a 500 watt electric lamp, whilst chlorine was passed in at the rate of 30 parts per hour for 5½ hours. Hydrogen chloride was evolved and a clear solution obtained. The solution was cooled to 50° C. and 800 parts of industrial ethyl alcohol were added over a period of 15 minutes, with stirring. The chlorinated polymer separated from the solution as a finely divided powder which was removed from the liquid by filtering, boiled with 400 parts of ethyl alcohol for 10 minutes, filtered again and dried in a vacuum oven at a temperature of 50–60° C. for 8 hours. The finely divided white powder so obtained had a chlorine content of 63.1 per cent and a 2 per cent solution in tetrachloroethane had a relative viscosity of 14.2, as measured in a No. 2 Ostwald viscometer at 20° C.

For purposes of comparison the process of the above example was repeated using 1,900 parts of carbon tetrachloride instead of 3,000 parts of the mixed organic liquids. The reaction medium was maintained at 75° C. during the chlorination and chlorine was passed into the suspension for 10 hours. The polymer did not go into solution during the reaction and the product was obtained as a finely divided white powder with a chlorine content of 60.4 per cent and a poor solubility in organic liquids such as ethyl acetate, butyl acetate and xylene. By reason of this insolubility the powder was not suitable for the production of films.

For further comparative purposes the process of the example was repeated using 3,200 parts of tetrachloroethane instead of the mixture of organic liquids. At first a stiff gel was formed which caused difficulty in stirring and in passing in chlorine, although after about 1½ hours the reaction medium became mobile. On coagulating with ethanol as described above the polymer was obtained as a gelatinous mass from which it was difficult to remove the solvent. It was, however, found that this chlorinated polymer could be isolated as a coarse white powder with a chlorine content of 64.1 per cent and satisfactory solubility and film-forming properties according to the method described in British specification No. 485,115, but this method involved the employment of large quantities of the coagulating liquid, took a considerable time to operate and required the use of conveniently low temperatures.

I claim:

1. Process for the manufacture of chlorinated polyvinyl chloride which comprises reacting chlorine with a suspension of polyvinyl chloride in a mixture of from 0.5 to 1.25 parts by weight of carbon tetrachloride and one part by weight of tetrachloroethane in which the proportion of the polymer to the mixture of organic liquids lies in the range of 1 part by weight of the polyvinyl chloride to 14 to 17 parts by weight of the mixed liquids so as to produce a chlorinated product soluble in ethyl acetate, butyl acetate and xylene.

2. Process for the manufacture of chlorinated polyvinyl chloride which comprises reacting chlorine with a suspension of polyvinyl chloride in a mixture of from 0.5 to 1.25 parts by weight of carbon tetrachloride and 1 part by weight of tetrachloroethane so as to produce a chlorinated product soluble in ethyl acetate, butyl acetate and xylene.

3. Process for the manufacture of chlorinated polyvinyl chloride which comprises reacting chlorine with a suspension of polyvinyl chloride in a mixture of from 0.5 to 1.25 parts by weight of carbon tetrachloride and one part by weight of tetrachloroethane at a temperature not removed by more than 10° C. from the boiling temperature of the mixed liquids so as to produce a chlorinated product soluble in ethyl acetate, butyl acetate and xylene.

4. Process for the manufacture of chlorinated ployvinyl chloride which comprises reacting chlorine with a suspension of polyvinyl chloride in a mixture of from 0.5 to 1.25 parts by weight of carbon tetrachloride and one part by weight of tetrachloroethane and recovering solid chlorinated polyvinyl chloride from the resulting solution so as to produce a chlorinated product soluble in ethyl acetate, butyl acetate and xylene.

5. Process according to claim 4 in which the solid chlorinated polyvinyl chloride is recovered from the solution by coagulation with a lower aliphatic alcohol, at a temperature not higher than 50° C.

WILLIAM JOHN ROY EVANS.